INVENTORS
ROBERT B. ESSEX,
MURRAY KRAVIS &
BY   NICHOLAS C. HEYMAN

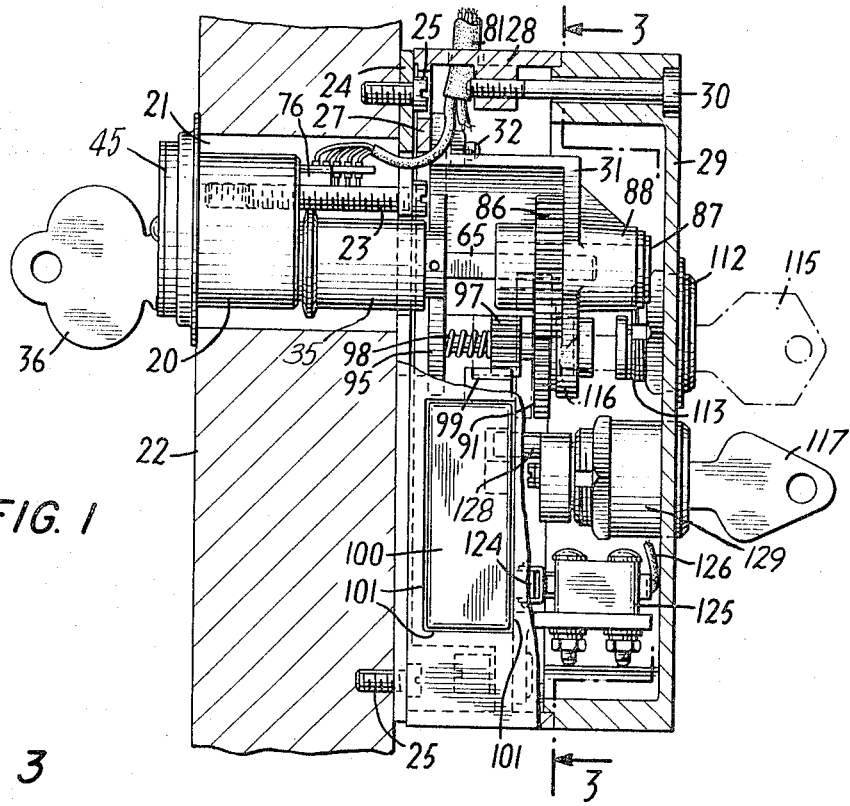
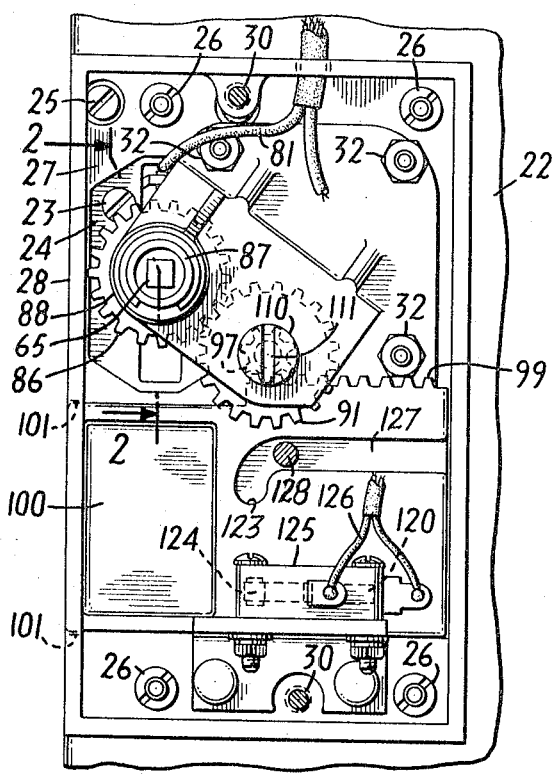

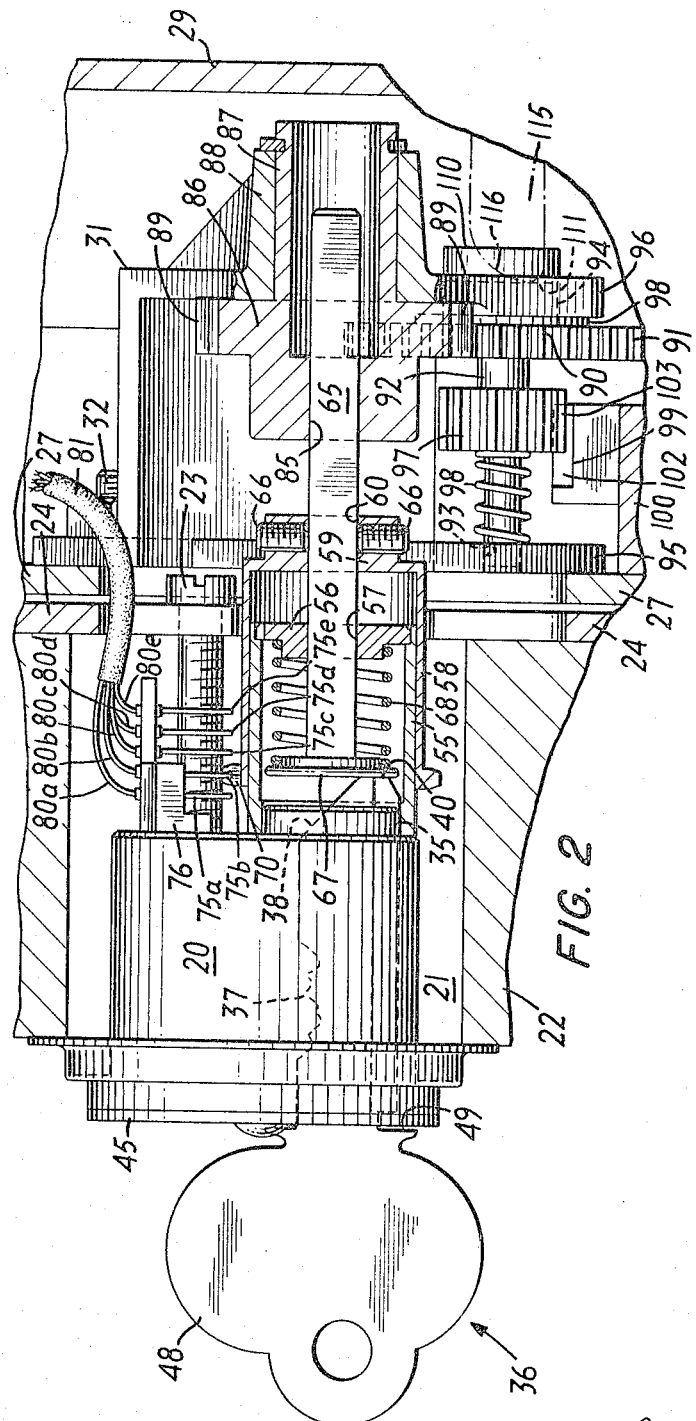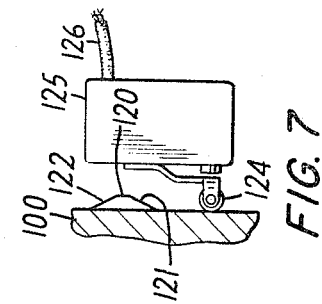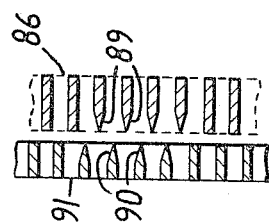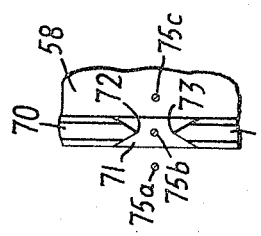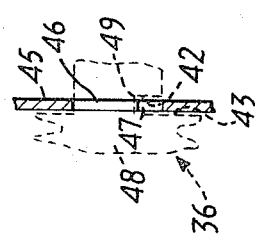

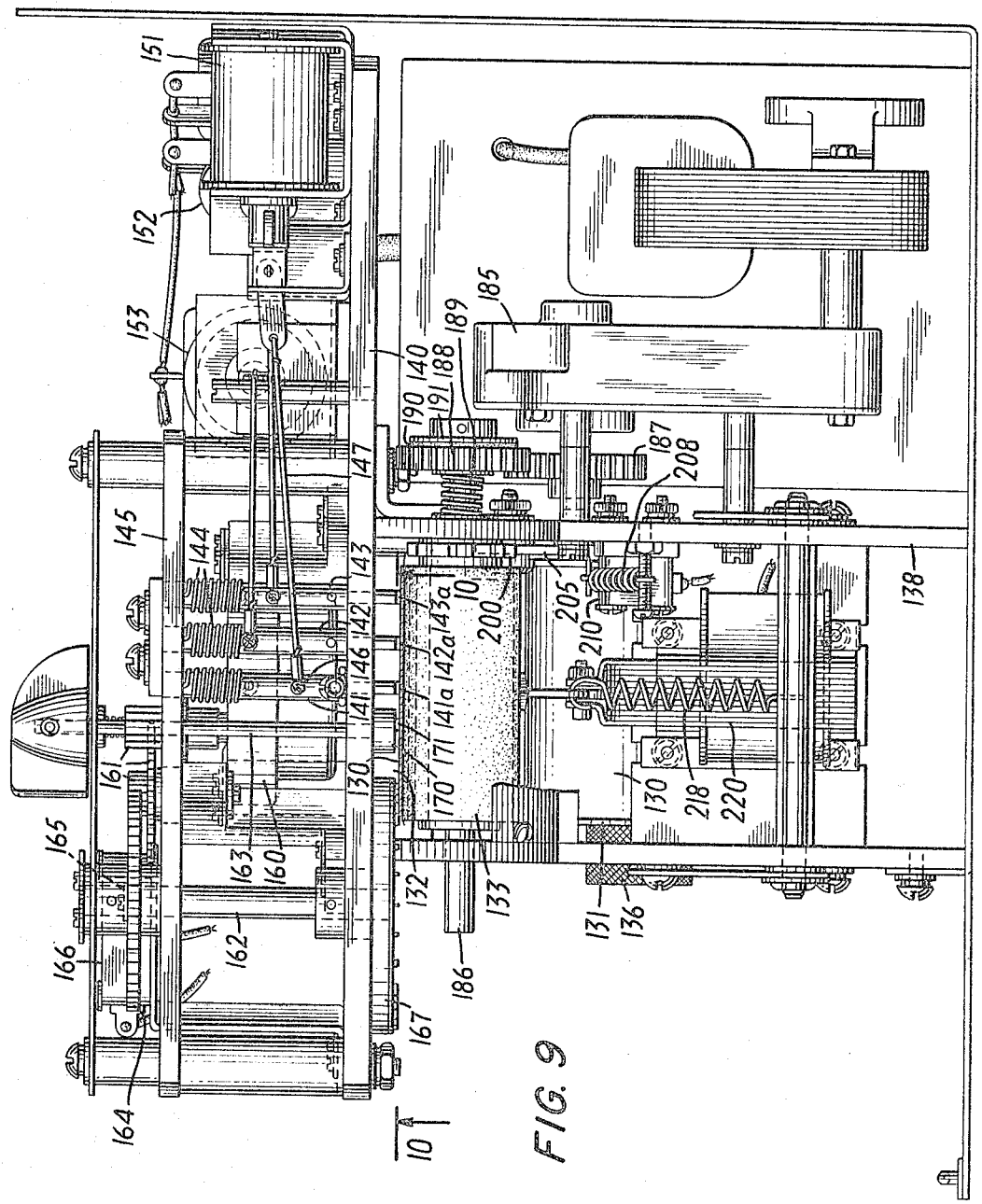

Brumbaugh, Free, Graves
& Donohue
their   ATTORNEYS

INVENTORS
ROBERT B. ESSEX,
MURRAY KRAVIS &
BY NICHOLAS C. HEYMAN
Brumbaugh, Free, Graves
& Donohue
their ATTORNEYS

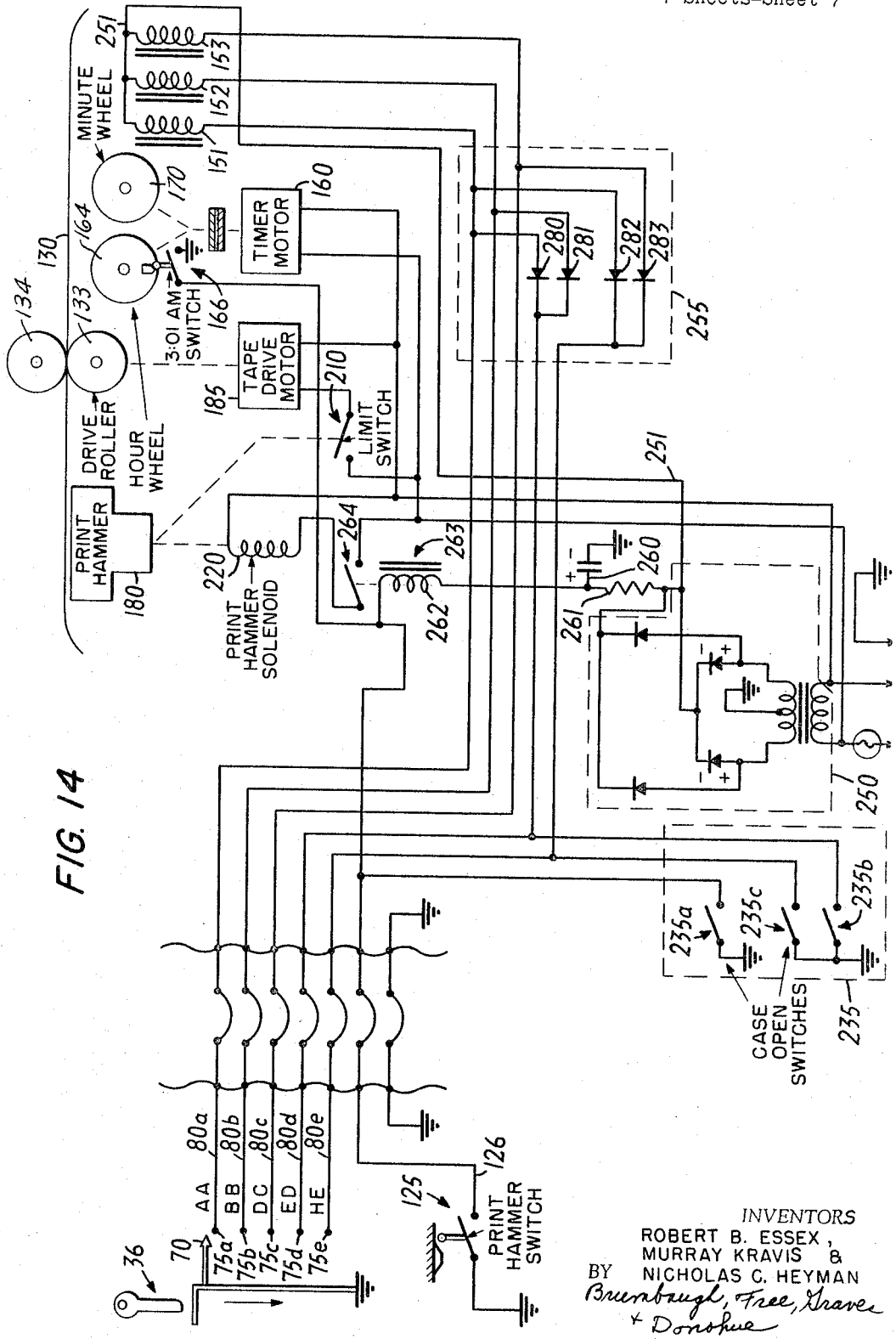

United States Patent Office 3,302,211
Patented Jan. 31, 1967

3,302,211
KEY-IDENTIFYING LOCK SYSTEM AND
COMPONENTS THEREFOR
Robert B. Essex, Hicksville, Nicholas C. Heyman, New York, and Murray Kravis, Seaford, N.Y., assignors to The Lock-Tronic Corporation, Columbus, Ohio, a corporation of Ohio
Filed July 16, 1964, Ser. No. 383,010
21 Claims. (Cl. 346—53)

This invention relates to a system for identifying a key utilized to turn a lock. The invention also relates to components which are disclosed herein in connection with such a key-identifying system, but which are of application elsewhere.

The invention in one of its aspects is realized by apparatus comprised of a lock turntable by keys of different shapings and of signalling means responsive to the shaping of each such key to provide an electric signal selectively indicative of the identity of that key. The signals so produced may be utilized (in conjunction with knowledge of the ownership of the keys) to ascertain which person or persons turn the lock for the purpose of, say entering or leaving a room intended to be kept secure.

As another aspect of the invention, each key-identifying signal is recorded to provide a permanent record of each of the keys used to turn the lock. The recording of such signal is preferably (but not necessarily) accompanied by an automatic recording of the time at which the lock was turned. Other events which are preferably (but not necessarily) recorded are (a) the registration by clock means of a particular time in a 24 hour day, (b) the operation of the lock from the side other than that from which said differenlty shaped keys are inserted, (c) the opening of the casing of the recording means. In accordance with the invention, key-identifying signals and the last-named indications may be recorded in the form of multiple-digit binary codings.

The invention also comprehends the improvement in a lock (whether or not it is of the key identifying type) of utilizing the main key cylinder as the stop which holds the bolt in locked position and (preferably) of providing means by which the holding coupling between the bolt and cylinder can be broken to permit the bolt to be moved between locking and unlocking positions by a key inserted into the lock from the side away from such cylinder.

Still other aspects of the invention relate to improvements in a recording mechanism whether or not such mechanism is utilized in conjunction with a key-identifying lock. Such improvements are, specifically, means to provide a step by step advance of a record strip through a recording zone, means to keep the record strip taut, and means to record on the strip a binary digital representation of a signal or of an indication to be recorded.

For a better understanding of the invention, reference is made to the following detailed description of a representative embodiment thereof and to the accompanying drawings wherein:

FIG. 1 is a side view (partly in section) of the lock section of a system according to the invention;

FIG. 2 is an enlarged side view (partly in section) of the lock section of FIG. 1;

FIG. 3 is an end view from the indoor side of the lock section of FIG. 1, the view being taken as indicated by the arrows 3—3 in FIG. 1; and the cover for the casing of the lock having been removed;

FIG. 4 is a fragmentary view showing a portion of the face plate for the FIG. 1 lock, the view being taken in vertical cross section through the axis of the face plate;

FIG. 5 is a fragmentary plan view of a portion of the contact ring and outer sleeve of the FIG. 1 lock;

FIG. 6 is a fragmentary view showing some of the teeth on each of the two spur gears of the FIG. 1 lock, the view being arrived at by taking a cylindrical cross section co-axial with each gear through such teeth of each gear and then developing each such cross section to make it planar;

FIG. 7 is a fragmentary downward view (partly in cross section) showing the tripping cam on the bolt of the FIG. 1 lock and, also, the micro-switch actuated by that cam;

FIG. 9 is a side view of the FIG. 8 recorder section, there being no record strip in the recorder, the cover for the drive roll of the recorder having been removed, and the view being taken as indicated by the arrows 9—9 in FIG. 8;

FIG. 14 is a schematic view of the electric circuits employed in the system to which the FIG. 1 lock and the FIG. 8 recorder belong; and FIG. 15 is a tabulation of the events recorded by the system and of the character of the record produced by each such event.

THE LOCK

Figure 8:
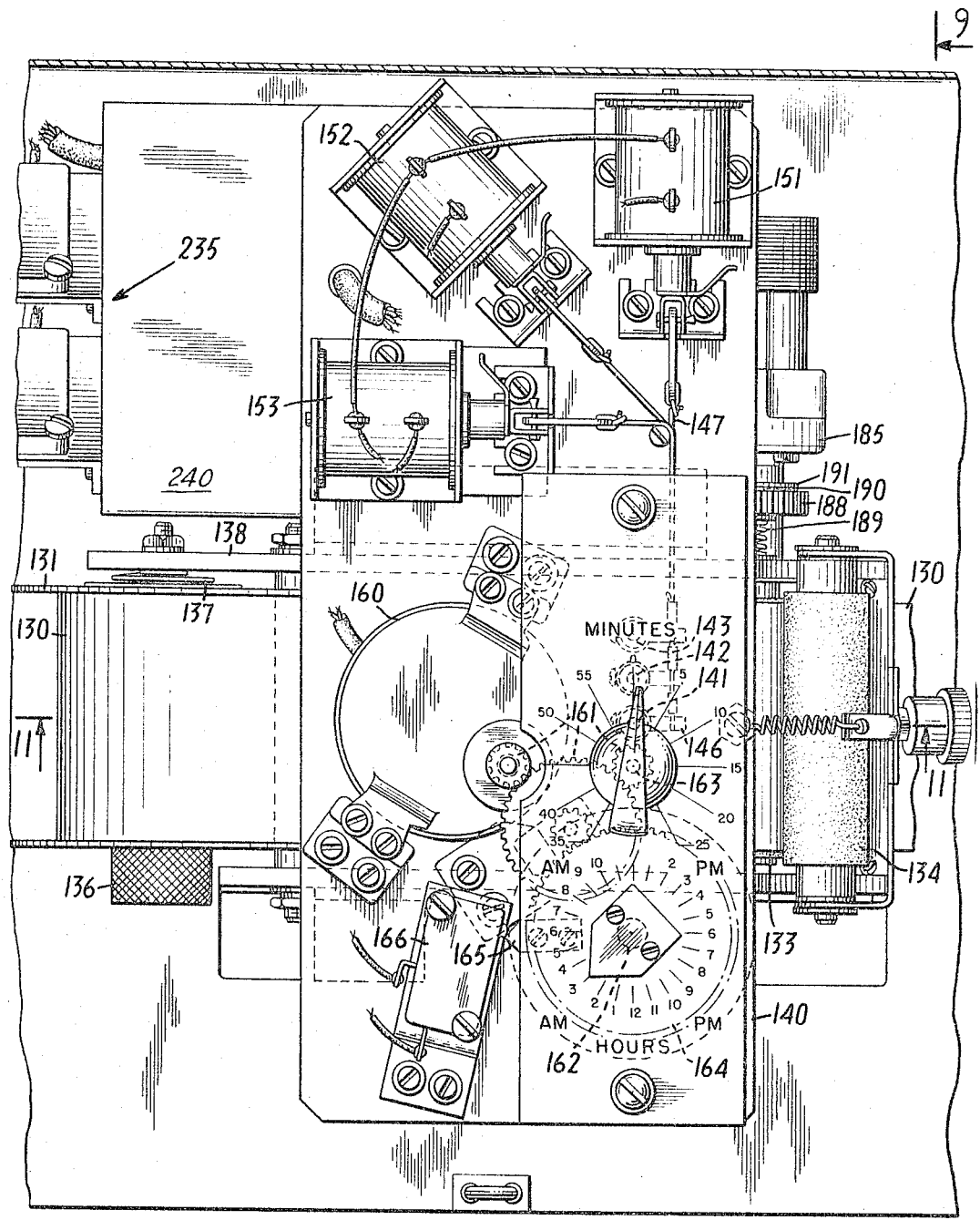
FIG. 8 is a plan view of the recorder section of the system to which the FIG. 1 lock belongs.

Referring now to FIGS. 1, 2 and 3, the reference numeral 20 designates a conventional key cylinder mounted within a receptacle 21 in the stile of a door 22 by being secured by a screw 23 to a mounting plate 24 fastened to the indoor side of door 22 by screws 25. Attached to plate 24 by screws 26 (FIG. 3) is the base plate 27 of a casing 28 having a cover 29 fastened to the casing by screws 30. A gear housing 31 is fastened to base plate 27 by screws 32 (FIG. 3).

The key cylinder 20 contains the usual key plug 35 (FIG. 2) which is rotatable within the cylinder only by full insertion in the plug and subsequent rotation therein of a key 36 having broachings 37 matching the pins and recesses (neither shown) of the cylinder. Otherwise, the plug is held fixed against rotation in full locked (or full unlocked) position by the pins of the cylinder.

The shown key 36 is the key BB of a set of five keys AA, BB, DC, ED, and HE, for which the reference numeral 36 is used herein in a generic sense.

Each of those five keys is characterized by similar broachings 37 so as to permit any one of such keys to turn plug 35. The keys, however, have different shapings in that, forward of their broachings, they have shank portions 38 which are of different length. Because of those different length portions, the shank ends 40 of such keys (when inserted through plug 35) are spaced by different axial distances from the indoor end of cylinder 20. If the inserted key had no axial play relative to the cylinder, each such distance would be exactly fixed.

In practice, however, it is common for a key cylinder of conventional construction to allow some axial play of a key fitted therein so that, without anything more, the spacing from the cylinder of the key end 40 would be relatively imprecise. To minimize such imprecision, the shown lock has mounted over the front of plug 35 a face plate 45 (FIG. 4) having a fixed axial position relative to cylinder 20. The plate 45 has formed therein a circular aperture 46 (coaxial with plug 35) and a notch 47 extending downward from the bottom of the aperture. The transverse width of notch 47 exceeds only by a clearance the transverse width of the key.

Just forward of its handle 48, the key 36 has formed in one side thereof a laterally extending slot 49 of a width between its forward wall 42 and rear wall 43 which exceeds only by a clearance the axial thickness of the face plate 45. At slot 49, the lateral dimensions of the key as measured from the inner end and the outer end (at wall 42) of slot 49 to the other side of the key are greater than and less than, respectively, the diameter of the aperture 46 in the face plate. The lateral dimension of the key as measured from the outer end at wall 42 is less than the dimension for the face plate from the bottom of slot 47 to the point directly opposite on the wall of aperture 46. The lateral dimension of the key as measured from the outer end of wall 43 is, however, greater than the last-named dimension for the face plate.

Because of the described dimensions, the key 36 while in vertical position may be inserted through aperture 46 and notch 47 into plug 35 until wall 43 contacts face plate 45. Thereafter, when the key is turned slightly (less than 1°), the face plate at the margin of aperture 46 becomes received in the slot 49 to constrain the key from axial movement while permitting further turning of the key. Since plate 45 is axially fixed relative to cylinder 20, and since the shank end 40 of each key has a predetermined axial spacing relative to the slot 49 of that key, it follows that the axial constraint of each such key by face plate 45 serves to space the shank end of the key by an exact predetermined distance from cylinder 20.

The identity of each key in the mentioned set is recognized by means as follows. Secured to the indoor end of plug 35 to rotate therewith is an inner sleeve 55 (FIG. 2) having at its end away from plug 35 a closure 56 in which is formed a square aperture 57 coaxial with the path of the key through the plug. Disposed around inner sleeve 55 in axially slidable relation therewith and in contact therewith is an outer sleeve 58 having an end closure 59 outward of the closure 56 of the inner sleeve. The closure 59 has therein a square aperture 60 matching the aperture 57.

Extending axially through apertures 57 and 60 is a plunger rod 65 having a square cross section matching those of the apertures such that rod 65 is locked for rotation with both the sleeve 55 and the sleeve 58. The rod 65 is axially slidable through aperture 57 so as to be uncoupled for axial movement with the inner sleeve. The rod is, however, coupled for axial movement with outer sleeve 58 by set screws 66 passing radially through the end closure 59 of that sleeve.

As shown, one end of rod 65 is disposed within the interior of sleeve 55 and is capped by a flange plate 67. A compression spring 68 is disposed around the rod between plate 67 and end closure 57 to bias the rod 65 towards the indoor end of plug 35.

The sleeve 58 at its end towards plug 35 carries a raised, electrically grounded, contact ring 70 of which the continuity around the sleeve is broken by a gap 71 (FIG. 5) of which the opposite walls are chamfered to form knife edges 72, 73. When the ring 70 is at an angular reference position (corresponding to the angular position of plug 35 when the key therein is wholly vertical), the gap 71 is bisected by the vertical plane which passes through the axis of sleeve 58.

Disposed in that vertical plane are a set of five fixed electrical contacts in the form of vertical spring wires 75a–75e of which each corresponds to a respective one of the five keys AA, BB, DC, ED, and HE, contact 75a being for key AA, and so on. The wires 75a–75e are insulated from and extend downward from a support 76 mounted on cylinder 20 to space the wires from the cylinder by respective fixed distances of different value. The distance by which each such wire is so spaced differs by only the same constant value (which may be zero) from the distance by which the shank end 40 of the key corresponding to that wire is spaced from cylinder 20 when the key is inserted in plug 35 and is constrained in axial position by the face plate 45. By virtue of this distance relationship between the five fixed contacts 75a–75e and the shank ends of the five corresponding keys, each of those keys when fully inserted into plug 35 is adapted in a way later described (in more detail) to produce an axial registration between the corresponding fixed contact and the ring 70.

The lower ends of the contacts 75a–75e are vertically disposed inward of the rim of ring 70 but, outward of the bottom of gap 71. Moreover, those contact ends are disposed in centered relation in gap 71 when the ring 70 is at its reference position. Hence, during axial movement of ring 70, the fixed contacts 75a–75e are adapted to pass through gap 71 without engaging ring 70 so long as that ring angularly remains at its reference position.

As shown, the fixed contacts 75a–75e are each connected to a respective one of a set of leads 80a–80e passing through a cable 81 to the recorder shown in FIG. 8. When insertion of a key 36 in plug 35 renders the ring 70 in axial registration with the one of those fixed contacts which corresponds to that key, and when thereafter the ring is rotated by one degree or more from its reference position, the ring engages that contact to produce a single-valued electric signal which is selectively indicative of the inserted key by virtue of being developed by the fixed contact corresponding to the key. Such signal is transmitted from the contact via the corresponding lead to the recorder which responds to the signal in a manner hereinafter described.

Continuing with a description of the lock, the plunger rod 65 extends rightward from sleeve 58 to pass in axially slidable relation through a square aperture 85 in the hub of a spur gear 86 having a bearing 87 in a journal 88 formed in the gear housing 31. The cross section of aperture 85 matches that of rod 65 so that the rod and gear 86 are locked together for rotation. The teeth 89 of gear 86 are normally in meshed relation with the teeth 90 of another spur gear 91 mounted in rotatably fixed relation on a shaft 92 rotatable in and axially slidable in journals 93 and 94 formed in oppositely disposed walls 95 and 96 provided by the housing 31. A pinion gear 97 is mounted in axially and rotatably fixed relation on shaft 92 and is biased rightwardly by a compression spring 98 disposed around the shaft between the pinion and the wall 95. The bias imparted to the pinion is transmitted through shaft 92 to gear 91 to urge that gear against a washer 98 disposed around shaft 92 between the gear and wall 96. Ordinarily, the spring 98 keeps the teeth of gear 91 engaged with those of gear 86.

The pinion 97 meshes with a rack gear 99 on top of a locking bolt 100 (FIG. 3) movable transversely in a guideway 101 (FIG. 1) between a full unlocking position (FIG. 3) and a full locking position at which the bolt extends farthest leftward from the lock casing 28. As shown (FIG. 2), the teeth 102 of rack 99 are wider than the teeth 103 of pinion 97 in an amount which assures continued meshing of the rack and pinion when shaft 92 is shifted leftward sufficiently to disengage the teeth of spur gear 91 from those of spur gear 86.

To the end of effecting such shift, the shaft 92 is capped at its rightward end by a head 110 diametrically traversed by a slot 111 accessible from the right-hand side of wall 96. The slot is disposed opposite a key cylinder 112 (FIG. 1) extending through cover 29 and containing a key plug 113 coaxial with head 110 and rotatable by insertion in the plug and subsequent rotation therein of an indoor key 115.

When key 115 is fully inserted in plug 113, the shank end 116 of the key fits snugly into slot 111 to press shaft 92 leftward (against the bias of spring 98) until gear 91 becomes disengaged from gear 86. Meanwhile, the pinion 97 remains in meshed relation with the rack 99. Subsequent rotation of the key is transmitted by the coupling of its end 116 in slot 111 to the head 110 and then to shaft 92 and to the pinion 97.

When the key 115 is thereafter withdrawn from plug 113, the spring 98 urges gear 91 into re-engagement with gear 86. To facilitate such re-engagement, the teeth 89 and 90 which thereupon mesh are chamfered (FIG. 6) at their ends towards each other so that the two sets of teeth slide smoothly past each other despite any slight angular misalignment of the two gears. In this connection, it is to be noted that, when no key 36 is in plug 35 (i.e., when the lock is being operated by key 115), the gear 86 is angularly positioned at the reference position previously described in connection with gear 70. Moreover, when key 115 is being withdrawn from plug 113, the key is necessarily kept vertical in the plug (to permit withdrawal), wherefore the gear 91 at that time is angularly positioned at a reference position so as to be aligned (apart from tolerance errors) for re-engagement with gear 86. Since both of the gears are thus at reference positions during re-engagement, the same teeth on gear 86 always mesh during re-engaging with the same teeth on gear 91. Therefore, only those particular teeth of the two gears need be and are chamfered.

The bolt 100 carries on its indoor side a tripping cam 120 (FIGS. 3 and 7) having slanted camming surfaces 121 and 122 of which each is adapted to contact the roller 124 of a microswitch 125, surface 121 being used when the bolt is moving towards full locking position, and surface 122 being used when the bolt is moving towards full unlocking position. Cam 120 and roller 24 are relatively disposed so that contact therebetween occurs when the bolt is about midway between said two positions. The making of contact between the cam 120 and the roller serves to close the microswitch 125 to thereby produce on lead 126 a tripping signal which is supplied to the FIG. 8 recorder to actuate it as hereinafter described in more detail.

Bolt 100 has therein (FIG. 3) a groove 127 with an arcuate end 123. The bolt may be held locked by the positioning at the bottom of end 123 of a stop pin 128 rotatable with a key cylinder 129 (FIG. 1) passing through lock cover 29. Plug 129 may be rotated to unlock the bolt by the insertion therein and subsequent rotation therein of a key 117. Key 117 is one of a set of keys in interlocking relation in that key 117 is made available for insertion in the FIG. 1 lock by being taken from the lock of a door next inwards of the FIG. 1 lock but is not releasable from that door to the user of key 17 until such person has locked the door next inwards from the FIG. 1 lock, the key for unlocking the last-named door is not releasable to the user until the door next in is locked, and so on. Since such interlock scheme is conventional, it is not described herein in further detail.

THE RECORDER

Turning now to a consideration of the recorder, a record strip 130 (FIG. 11) of pressure sensitive paper is unwound clockwise from a supply spool 131 and is drawn through recording zone 132 by passing between a neoprene drive roll 133 (of 80 durometers hardness) and a neoprene idler roll 134 (of 45 durometers hardness). The spool 131 is rotatably mounted on an axially and rotatably stationary shaft 135 having one end supported by a mounting plate 138, the opposite end of the shaft being free.

Threadedly received on the free end of shaft 135 is a knurled nut 136 (FIG. 8) adapted by virtue of its threaded engagement with the shaft to be tightened on the shaft by clockwise rotation of the nut. A helical compression spring 137 is disposed around shaft 135 between plate 138 and spool 131 so as to urge the latter into frictional contact with the nut 136. When the record strip is being drawn from the spool by the drive roll 133, the consequent clockwise rotation of the spool tends to maintain nut 136 tight on and angularly stationary relative to shaft 135. The frictional force between the stationary nut and the rotating spool exerts on the unwinding record strip a "drag" which keeps the strip taut in the recording zone 132.

Figure 10:
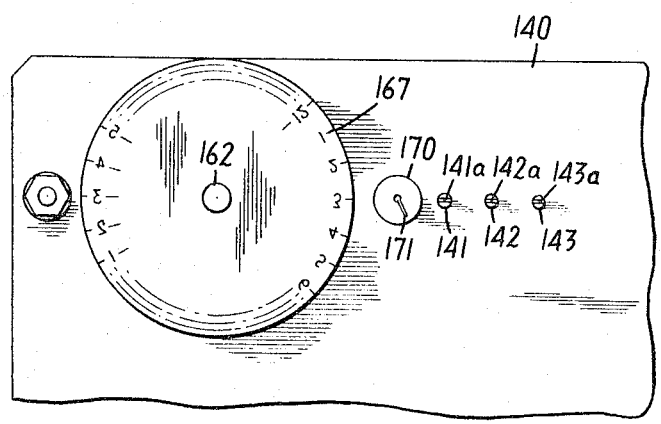
FIG. 10 is a bottom view of the printing elements of the FIG. 8 recorder.

Above zone 132 is (FIG. 9) a mounting plate 140 through which pass the forward ends of three transversely spaced vertical pivot rods 141, 142 and 143. The rod 141 has on its front face at its forward end a raised line portion providing a printing element 141a (FIG. 10). The rods 142 and 143 have similar printing elements 142a and 143a, respectively. All three rods are rotatable about their respective axes and are urged counterclockwise (FIG. 10) to be ordinarily held against stops (not shown) by tension springs 144 (FIG. 9) encircling the rods and having lower ends connected to their respective rods and upper ends connected to a support plate 145 for the rods and other components of the recorder.

When each of the three rods is held, as described, against its stop, the printing elements 141a–143a are in the position shown in FIG. 10, i.e., are aligned with each other and disposed in a line transverse to the direction of travel of the record strip 130.

The rod 141 is connected by a radial pivot arm 146 (FIG. 9) and by a cord 147 to the armature of a solenoid 151 (FIG. 8). The rods 142 and 143 are similarly connected to, respectively, a solenoid 152 and a solenoid 153. Each solenoid when energized is adapted to rotate the corresponding rod clockwise (FIG. 10) from its stop so as to position the printing element on the rod diagonal to the direction of travel of the strip 130. When the solenoid is de-energized, the rod is again urged by its spring 144 against the stop for the rod to thereby restore the printing element on the rod to the position shown in FIG. 10.

The plate 140 supports (FIG. 8) an electrically driven 24 hour clock 160 connected by gearing 161 to an hour shaft 162 and a minute shaft 163. The hour shaft 162 has on its top an hour-indicating wheel 164 characterized by a projecting tooth 165 which contacts and closes a micro-switch 166 at 3:01 a.m. From wheel 164, the hour shaft extends downwardly (FIG. 9) through plate 140 to carry below that plate a printing wheel 167 of which the bottom face is characterized (FIG. 10) by a circle of raised numbers representing a.m. and p.m. hours, the latter hours being distinguished from the former by a minus (—) sign preceding the corresponding number on the wheel. Only that number (or two numbers) on wheel 167 nearest to elements 141a–143a is (are) disposed in the recording zone 132 so as to be printed out during a recording operation.

The minute shaft 163 likewise extends downwardly (FIG. 9) through plate 140 to terminate in a head 170 in the recording zone 132. The head 170 has on its front face (FIG. 10) a radial, raised, line printing element 171 which rotates like the minute hand of a clock.

The recording on strip 130 of marks from elements 141a–143a, element 171 and the appropriate number on the hour printing wheel 167 is accomplished by the striking action of a print hammer 180 disposed (FIG. 11) below strip 130 on the side of zone 132 opposite from that occupied by the printing elements. In between recordings, the strip is advanced through a step of about ⅜″ by drive roll 133 to present a fresh surface of the strip to the printing elements. The striking action of the hammer and the step by step advancing action of the roll 133 are interrelated in a manner as follows.

The roll 133 is driven by an electric motor 185 (FIG. 9) coupled to the shaft 186 for the roll 133 by a gear 187 meshing with another gear 188 loose on shaft 186 and urged rightward on the shaft by a spring 189. The gear 188 has on its right-hand side a clutch plate 190 maintained by spring 189 in friction contact with a clutch plate 191 mounted in axially and rotatably fixed relation on shaft 186 at the right-hand end thereof. Thus, a friction clutch is interposed in the coupling between motor 185 and roll 133, the latter being mounted in axially and rotatably fixed relation on shaft 186.

The said shaft has mounted in axially and rotatably fixed relation thereon a multi-tooth escapement ratchet 200. Ordinarily, rotation of the ratchet end, thus, of roll 133 is prevented by a pawl 201 (FIG. 12) inserted between two teeth 200a and 200b of the ratchet. The pawl 201 is carried on the upper side of the rear end of a lever 205 pivoted near its center by a lost motion pivot coupling comprised of a pin 206 passing through a slot 207 of greater dimension in the length of lever 205 than the diameter of the pin. The lever 205 is urged rearwardly and counterclockwise around pin 206 by a tension spring 208. Despite the rearward urging of lever 205 by spring 208, in FIG. 12 the angular position of ratchet 200 is such as to hold lever 205 forward, i.e. with pin 206 in contact with the rear end of slot 207.

On the lower side of its rear end, the lever 205 carries a flange 209 disposed above a microswitch 210 and out of contact with the microswitch when pawl 201 is holding ratchet 200 against rotation. The microswitch 210 is in the power circuit for motor 185 and is ordinarily "open" to maintain that motor de-energized. When, however, the microswitch is contacted by flange 209, the switch 210 becomes "closed" to thereby energize motor 185.

As shown, the print hammer 180 is disposed above lever 205 and has at its upper right-hand end a neoprene striking pad 215 positioned at the recording zone 132 directly below the printing elements. The hammer 180 is pivoted somewhat to the right of its center by a pin 216 passing through the hammer. To the left of pin 216, the hammer has a pivotal connection with one end of a link 217 pivotally connected at its other end with the armature of a solenoid 220. To the right of pin 216, the hammer is connected to a tension spring 218.

The left-hand end of hammer 180 carries a finger 221 of which the upper end is pivotally connected at 222 to the hammer. A spring 223 at pivot 222 urges the finger counterclockwise around the pivot. From its pivoted end, the finger 221 extends downward below the hammer proper to a tip 224 which is inturned to extend toward the rear end of lever 205. For the recorder condition represented by FIG. 12, the free end 225 of tip 224 rests against a slanting front face 226 of the lever. During recorder operation, however, the tip 224 is adapted (as later explained) to engage with the forward underface 227 of lever 205.

Figure 13:
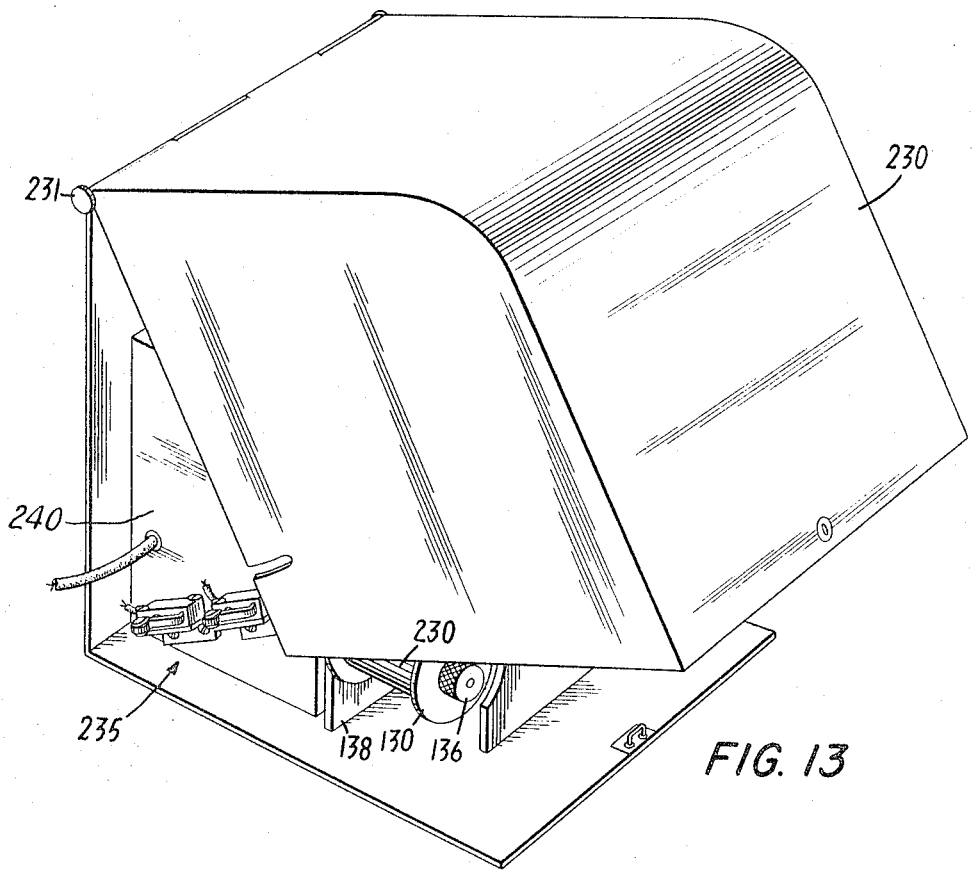
FIG. 13 is an isometric view of the casing of the FIG. 8 recorder and of a microswitch actuated by the opening and closing of such casing.

Referring to FIG. 13, the described recorder has a cover 230 hinged at 231. The opening of cover 230 serves to "close" a normally "open" microswitch 235 for a purpose hereinafter described.

The electric circuits for operating the described lock-recorder system are contained in a box 240 (FIGS. 8 and 13) forming part of the recorder. The character and functioning of those circuits will be explained in the course of the immediately following description of the operation of the system.

OPERATION

Figure 12:
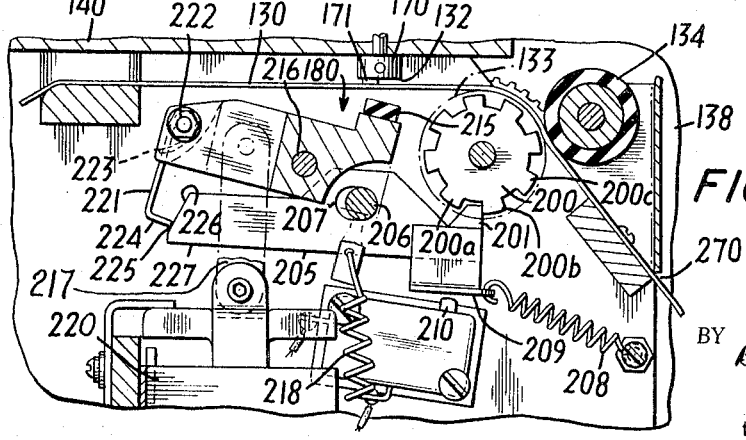
FIG. 12 is similar to FIG. 11 but shows the print hammer and associated components at a different stage of operation than those represented in FIG. 11.

Assume initially that no key is inserted in the key cylinder 20 (FIG. 2). Under such condition, the contact ring 70 is angularly at its reference position and axially to the left of fixed contact 75a. Also, spur gear 86 is engaged with spur gear 91. The recorder (FIG. 8) is inactive with hammer 180 and lever 205 being positioned as shown in FIG. 12, and with a fresh surface of record strip 130 being presented at zone 132 to the printing element on the upper side of that zone.

Assume now that the key BB is inserted through aperture 46 and notch 47 of face plate 45 (FIG. 4) into the plug 35 of the key cylinder. Because the transverse width of notch 47 exceeds that of the key only by a clearance, the key in order to pass through the notch must be kept vertical during insertion. The forward movement of the key is arrested by the coming into contact with face plate 45 of the wall 43 of the guide slot 49 in the key.

The vertical position of the key during insertion keeps the plug 35, sleeve 55, rod 65, sleeve 58 and ring 70 from rotating in the course of key insertion. Hence, the ring 70 remains at its reference position for which the contacts 75a-75e are free to pass through gap 71 in the ring without engaging the ring. Towards the end of the key insertion, the shank end 40 of the key presses against flange plate 67 to displace rod 65, sleeve 58 and ring 70 rightward. Because contact 75a is centered in relation to ring gap 71, the ring 70 slides with clearance past that contact to be in axial registration with contact 75b when key BB is fully inserted in plug 35.

The key is now turned clockwise (looking towards the lock from the street side) to produce rotation of the elements 35, 55, 65, 58, 70, 86, 91, 92, and 97. Before the key has turned one degree, the portion of face plate 45 at the margin of aperture 46 is received in the guide slot 49 of the key to fix the axial position of the key relative to cylinder 20 and, thereby, to maintain ring 70 in precise axial registration with the fixed contact 75b.

When the key BB has been turned about one degree in the plug 35, the consequent rotation of ring 70 brings the contact 75b into engagement with the knife edge 72 (FIG. 5) at the side of the gap 71. Such engagement produces an electric signal transmitted via lead 80b to the recorder.

More specifically, the engagement of ring 70 with fixed contact 75b completes a circuit (FIG. 14) through which 24 volt D.C. current flows from a current source 250 (having a ground connection) through a "hot" lead 251, the solenoid 152, a matrix circuit 255, lead 80b, fixed contact 75b, ring 70 and thence to ground to return to the current source. The solenoid 152 is energized by such current to rotate pivot rod 142 so as to render its printing element 142a diagonal to the direction of travel of record strip 130. Inasmuch as the other pivot rods 141 and 143 are not rotated by the signal from contact 75b, the printing elements 141a-143a of the three rods form the printing pattern which is shown in FIG. 15 opposite the notation "BB." With the formation of such pattern, the recorder is set up to print out an impression of the pattern when the print hammer 180 is actuated.

Once the key BB and the ring 70 have turned together past the point at which the fixed contact 75b first engages knife edge 72, the wire contact 75b slips to one side of the knife edge to continue to remain in contact with ring 70. Hence, the circuit just described remains completed until the key has turned through about 360°.

As earlier mentioned, the turning of the key rotates the pinion 97. The pinion in turn drives rack 99 to move bolt 100 towards full locking position. When the key has been turned about 120°, the camming surface 121 on cam 120 (FIG. 7) contacts the roller 124 to close the microswitch 125. The closing of the microswitch completes a circuit through lead 126 (FIG. 14) permitting a capacitor 260 (charged from source 250 through resistor 261) to discharge through the winding 262 of a D.C. relay 263. The resulting surge of current through winding 262 momentarily closes the relay contacts 264 to complete a circuit for alternating current through the winding of solenoid 220. Such solenoid is thereby momentarily energized to pull down the left-hand end of print hammer 180 (FIG. 12) to thereby cause the pad 215 to strike the record strip 130 so as to bring it into contact with the printing elements on the upper side of the recording zone. Because the strip 130 is comprised of pressure-sensitive paper, its striking against elements 141a–143a (FIG. 10) causes a recording on the strip of the "BB" pattern shown in FIG. 15. Simultaneously, the printing wheel 167 (FIG. 10) records the hour at which the recording is made, and the element 171 records on the strip a line of which the angle indicates the minute in the hour at which the recording is made.

The striking action of the hammer is comprised of a series of strokes rather than just a single stroke. That is, because the striking pad 215 is made of resilient neoprene, the pad strikes but then bounces back from the record strip, but, thereafter, is driven by the solenoid to strike the strip again through a succession of strike and bounce cycles. It has been found that such vibrating striking action of the print hammer provides a more legible record than if the print hammer had a single stroke action.

When the capacitor discharge current through relay 263 falls to a low enough value, the relay contacts 264 open to de-energize solenoid 220, whereupon the spring 218 (FIG. 12) rotates hammer 180 to withdraw pad 215 from the record strip 130 and to elevate the left-hand end of the hammer. Thereafter, the current leaking from source 250 (FIG. 14) through resistor 261 is insufficient of itself to actuate relay 263. Hence, the hammer 180 is disabled from undergoing another striking action until the switch 125 opens to permit current through resistor 261 to recharge the capacitor 260.

In this connection, switch 125 can be opened only by movement of the lock bolt 100 away from the position at which the tripping cam 120 (FIG. 7) is in contact with the roller 124 of the switch. When, however, the bolt is once moved substantially away from that position, a separate recording takes place upon the return of the bolt to that position. It follows that, because of the hammer disabling action provided by the RC circuit 260, 261, the recorder unit cannot be jammed in operation by a key user who arrests the turning of his key so as to maintain the tripping cam 120 in contact with the microswitch roller 124.

Figure 11:
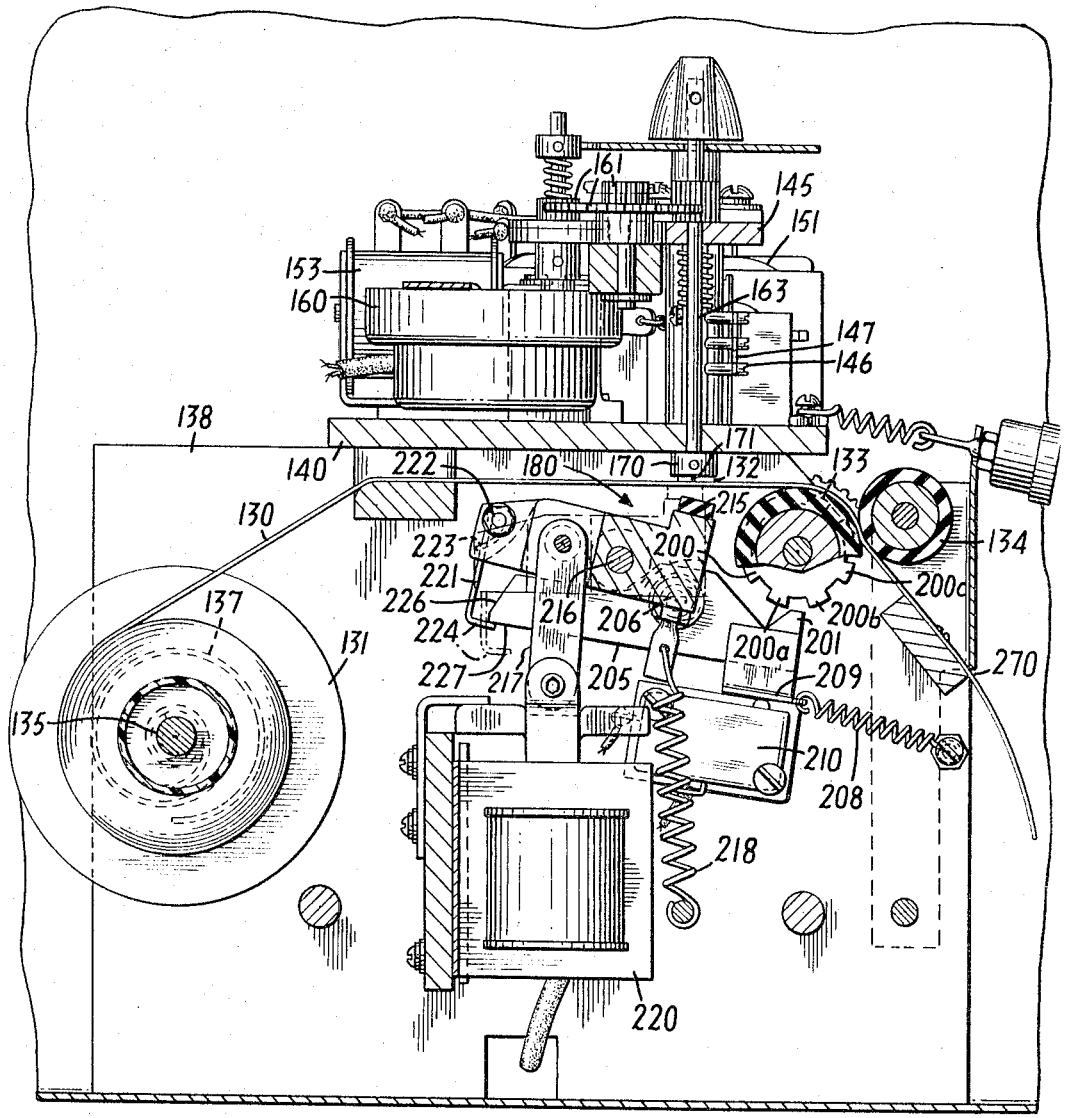
FIG. 11 is a view in side elevation of the printing hammer and associated components of the FIG. 8 recorder, the view being partly in cross section and being taken as indicated by the arrows 11—11 in FIG. 8.

The hammer striking action initiates a one-step advance of record strip 130 in a manner as follows:

When the left-hand end of the hammer 180 is pulled down by the solenoid 220, the hammer finger 221 is rotated by spring 223 to slip the finger tip 224 beneath the undersurface 227 of lever 205 (the position then assumed by finger 221 being shown in dotted outline in FIG. 11). When, thereafter, the left-hand end of the hammer is elevated by the de-energization of solenoid 220 and the subsequent pulling action of spring 218, the finger 221 lifts upward the left-hand end of the lever 205 to depress the right-hand end thereof. Such depression serves both to remove the pawl 201 from between the teeth 200a, 200b of ratchet 200 and to press flange 209 against microswitch 210 so as to close that switch.

FIG. 11 shows in solid outline the position of lever 205 when pawl 201 is disengaged from ratchet teeth 200a, 200b and flange 209 is pressing down on switch 210.

After pawl 201 is so released from between the teeth 200a, 200b, the tension spring 208 draws the lever 205 rearward, such drawing being permitted by the lost motion pivot coupling provided by the pin 206 and the slot 207 in the lever (FIG. 12). When the lever is so drawn rearward, the pawl 201 is positioned to ride upon the outer face of the tooth 200b. By virtue of this bearing of the pawl on the last named tooth, the right-hand end of lever 205 remains depressed despite the fact that another consequence of the rearward drawing is that lever undersurface 227 retracts from finger-tip 224 to become disengaged therewith, and that, moreover, the spring 208 urges lever 205 counterclockwise around pin 206 so as to tend to disengage flange 209 from switch 210.

With switch 210 being kept closed by the continued depression of flange 209, the switch maintains closed an A.C. power circuit for motor 185 (see FIG. 14). Accordingly, motor 185 transmits rotary motion (FIG. 9) through elements 187, 188, 190, 191, 186 to move drive roll 133 and ratchet 200 clockwise (FIG. 11). The drive roll movement unwinds the record strip 130 from spool 131 and advances a fresh portion of that strip into zone 132. Simultaneously, the portion of the strip which was just recorded upon is fed towards a slit outlet 270 for the strip.

The clockwise movement of roll 133 and ratchet 200 continues until the ratchet rotation brings the pawl 201 into registration with the space between the tooth 200b and the next following tooth 200c. Thereupon, lever 205 is rotated counterclockwise by spring 208 to slip pawl 201 into the mentioned space. The lever when so rotated lifts flanges 209 away from switch 210 to cause opening of that switch and de-energization of motor 185. The motor, however, coasts long enough for the ratchet (by virtue of its now engaged relation with pawl 201) to propell lever 205 forward until pin 206 (FIG. 12) bears against the rear end of slot 207. The lever can then move forward no further and, accordingly, the inserted pawl arrests further rotation of the ratchet 200 and the drive roll 133. In this way, the advance of record strip 130 through zone 132 is stopped when the strip has moved by a step of about ⅜".

When the lever 205 is, as described rotated counterclockwise by spring 208, the left hand end of the lever is depressed so that its front face 226 is presented to the end 225 of the finger tip 224. When, thereafter, the lever 205 is propelled forward by the ratchet 200, the face 226 engages and then pushes the tip 224 leftward to rotate finger 221 about its pivot 222 against the bias of spring 223. Upon the arresting by the lever of the rotation of ratchet 200, the various components associated with hammer 180 and lever 205 are restored to the positions shown in FIG. 12 except that pawl 201 is now inserted between ratchet tooth 200b and ratchet tooth 200c.

At the time the lever 205 arrests the rotation of the ratchet, the coasting motor 185 still has some momentum. Such momentum is, however, taken up by overtravel of the motor permitted by the friction clutch 190, 191 (FIG. 9), the excess kinetic energy of the motor being converted into heat in the clutch.

To summarize, the insertion of the key BB in plug 35 and the subsequent turning of the key by about 120° causes a recording of the "BB" pattern (FIG. 15) on strip 130 and the subsequent stepwise advance of the strip to bring a fresh portion thereof into the recording zone 132. While the strip is so being advanced, the user of the key continues to turn it to move the locking bolt 100 to full locking position.

Full locking is attained when the key has been rotated through 360° so that the key is again vertical and may be withdrawn from plug 35 through the aperture 46 and notch 47 in face plate 45. The turning of the key to vertical serves to angularly position ring 70 so that its gap 71 is again bisected by the line formed by fixed contacts 75a–75e. As the key is being withdrawn, the spring 68 forces the combination of components 67, 65, 58, 70 leftward to bring contact ring 70 to the left of the first fixed contact 75a. In the course of such leftward movement, the ring 70 is kept in its angular references (by the vertical withdrawal position of the key) and, therefore, the contact 75a passes through the gap 71 without engaging the ring.

The re-positioning of ring 71 at its initial leftward position and the full withdrawal of key BB from plug 35 restores the described lock-recorder system to the condition thereof which was initially assumed. In the interim, however, the system has made a recording which identifies as "BB" the key used in the lock to provide the locking action. Hence, assuming that the owner of key BB is known, the system provides a means of ascertaining who it was who turned the key for the purpose of locking up.

In connection with locking up, it is to be noted (FIGS. 1, 2 and 3) that, when gear 86 is engaged with gear 91, the plug 35 is positively coupled with the locking bolt 100. Moreover, after the key has been withdrawn, the plug is positively held in "lock" position by the pins of the key cylinder. It follows that, when the bolt is in a locking position, the plug 35 itself acts as a stop holding the bolt in that position. Absent the use of a proper key, by which the plug is rotated to "unlock" position, the bolt cannot be shifted from locking position to unlocking position except by shearing off the pins of the key cylinder or by breaking the gearing by which the plug 35 is connected to the bolt.

Unlocking is accomplished by the insertion in plug 35 and the subsequent turning therein through 360° of the key BB or another one of the set of five keys. The operation of the described system during unlocking is the same as before except that the key is turned counterclockwise (looking at the lock from the street side), the fixed contact engaged by ring 70 initially makes engagement with knife edge 73 (FIG. 5), and the roller 124 of the microswitch 125 (FIG. 7) is initially contacted by the camming surface 122 of the tripping cam 120.

While the operation of the system has so far been described in connection with key BB, the use in the lock of any other one of the five keys has substantially similar results except that ring 70 engages a fixed contact other than 75b to develop a signal productive of a recorded pattern different from that identifying the use of key BB in the lock. That is, when key AA is used, ring 70 engages contact 75a to energize only solenoid 151, wherefore only pivot rod 141 is rotated and the resulting recorded pattern is that shown opposite notation "AA" in FIG. 15. Analogously, when key DC is used, ring 70 engages fixed contact 75c to energize only solenoid 153, wherefore only pivot rod 143 is rotated, and the resulting recorded pattern is shown opposite the notation "DC" in FIG. 15. The recordings of the signals respectively identifying the keys ED and HE are non-analogous to the recording actions just described to the extent that two solenoids are energized for the purpose of recording the signal. Specifically, when key ED is used and ring 70 thereupon engages fixed contact 75d, one path for current flow is established through solenoid 151 and diode 280 of matrix circuit 255, and another path for current is established through solenoid 152 and diode 281 of that circuit. Hence, in response to the turning of key ED in the lock, both of solenoids 151, 152 are energized to rotate their corresponding pivot rods 141, 142 to thereby produce the recorded pattern "ED" (FIG. 15). Moreover, when key HE is used so that ring 70 engages contact 70e, a path for current is established through solenoid 151 and diode 282 of circuit 255, and another current path is established through solenoid 153 and diode 283 of circuit 255, wherefore both of pivot rods 142 and 143 are rotated, and the resulting recorded pattern is "HE" of FIGURE 15.

On occasion it is necessary to move the locking bolt 100 by the indoor key 115. In such instances, the key 115 is inserted (as earlier described) to disengage gear 86 from gear 91 (FIG. 2) and the key is then turned to rotate pinion 97 to move the bolt in the desired direction. As before, the bolt movement causes cam 120 to close microswitch 125 to thereby actuate the print hammer 180. None, however, of the solenoids 151, 152, 153 are then energized. Hence, the use of the indoor key for either locking or unlocking is indicated by the recorded "straight line" pattern shown in FIGURE 15 opposite the notation "inside lock."

As mentioned, a tooth 165 on hour wheel 164 (FIGURE 8) closes microswitch 166 at 3:01 a.m. Referring to FIG. 14 the switch 166 is in parallel with switch 125 to produce a recorded straight line pattern similar to that produced by the use of the indoor lock (see FIG. 15). Whether the straight line pattern represents use of the indoor key or 3:01 a.m. can easily be determined because the recorded straight line pattern signifying 3:01 a.m. will always be accompanied by a recording of the time "3:01 a.m."

As also mentioned, the opening of the recorder cover 230 (FIG. 13) closes a microswitch 235. As shown in FIGURE 14, the switch 235 comprises a switch section 235a in parallel with switch 125 and a pair of switch sections 235b and 235c connected to, respectively, the lead 80d and the lead 80e. The closure of section 235b establishes current paths for solenoid 151, 152 through respectively, the diodes 280, and 281. The closure of section 235c establishes current paths for solenoids 152 and 153 through, respectively, the diodes 282 and 283. The closure of switch section 235a substitutes for the closure of switch 125 as an event which initiates the striking action of the print hammer. In the circumstances, it will be evident that the opening of cover 230 results in the "all diagonal" recorded pattern shown in FIGURE 15 opposite the notation "case open."

Each of the patterns shown in FIGURE 15 consists of marks occupying three digit positions. In each position, the mark may be either horizontal or diagonal, i.e., may represent either the binary value of "0" or the binary value of "1." Hence, each of those patterns is a multiple digit binary coding representative of the single-valued signals provided by the contacts 75a–75e and the other signals within the system which result in recordings.

The above described embodiment being exemplary only, it is to be understood that additions thereto, modifications thereof and omissions therefrom can be made without departing from the spirit of the invention, and that the invention comprehends embodiments differing in form and/or detail from that which has been specifically described. Accordingly, the invention is not to be considered as limited save as is consonant with the recitals of the following claims.

We claim:

1. Apparatus comprising, lock means turnable by the insertion therein of any one of a selected plurality of keys of different shapings, a plurality of electric contacts each corresponding to a respective single one of said keys, each contact being responsive to said shaping of the corresponding key when inserted to provide a single-valued electric signal selectively indicative of the identity of that key, said plurality of contacts accordingly being adapted to provide a plurality of such signals of which each corresponds to a respective one of said contacts and of said keys, drive means to advance a record sheet through a recording zone, an array of selectively positionable recording elements disposed at said zone and lesser in number than said contacts, electromechanical positioning means for said elements, said electromechanical means being responsive to each of said signals to set up a different position permutation of said elements and being responsive one at a time to each of ones of said single-valued signals to set up the position permutation corresponding to such signal by changing the position of more than one of said elements, and record-forming means actuated after a one of said permutations has been set up to produce a recording on said sheet by said elements of respective marks representing that permutation.

2. Apparatus as in claim 1 further comprising clock means and means responsive to registration by said clock means of a predetermined time in a 24 hour day to produce an additional signal converted by said electromechanical means into a position permutation of said elements representative of said time, said last-named permutation being recorded like those produced from said first-named signals.

3. Apparatus as in claim 1 further comprising clock means, and an additional printing element incorporated in said array and driven by said clock means to indicate the time of turning of said lock means by a mark recorded on said sheet by such element in accompaniment with said marks from said first named elements.

4. Apparatus as in claim 3 in which the mark of said additional element represents minutes in an hour, and in which such mark is in the form of a line variable in angular position like the minute hand of a clock.

5. Apparatus comprising, lock means turnable by the insertion therein of any one of a selected plurality of keys of different shapings, signalling means responsive to said shaping of each such inserted key to provide an electric signal selectively indicative of the identity of that key, said signalling means accordingly being adapted to provide a plurality of such signals of which each corresponds to a respective one of said keys, drive means to advance a record sheet through a recording zone, an array of selectively positionable recording elements disposed at said zone, electromechanical positioning means for said elements, said electromechanical means being responsive to each of said signals to set up a different position permutation of said elements, recording means actuated after a one of said permutations has been set up to produce a recording on said sheet by said elements of respective marks representing that permutation, casing means for said record sheet, and means responsive to opening of said casing means to produce a signal converted by said electromechanical means into a position permutation of said elements representative of such opening, said last named permutation being recorded like those produced from said first named signals.

6. Apparatus comprising, lock means turnable by the insertion therein of any one of a selected plurality of keys of different shapings, signalling means responsive to said shaping of each such inserted key to provide an electric signal selectively indicative of the identity of that key, said signalling means accordingly being adapted to provide a plurality of such signals of which each corresponds to a respective one of said keys, drive means to advance a record sheet through a recording zone, an array of selectively positionable recording elements disposed at said zone, electromechanical positioning means for said elements, each of said elements being movable by said electromechanical means between first and second positions representative of the binary values "0" and "1," respectively, and said electromechanical means being responsive to each of said signals to set up a different binary position permutation of said elements, and record-forming means actuated after a one of said permutations has been set up to produce a binary recording on said sheet by said elements of respective marks representing that permutation.

7. Apparatus comprising, a key cylinder plug rotatable by the insertion therein and subsequent rotation therein of any one of a selected plurality of keys of different shapings, first switch means responsive to the shaping of any inserted one of said keys to produce a first electric signal selectively indicative of the identity of such key, means responsive to such signal to set up an indication thereof for recording, a bolt movable by rotation of said plug between a full locking and a full unlocking position, said bolt having thereon a tripping cam, second switch means actuated by said tripping cam to produce a tripping signal in response to movement of said bolt between said two positions, said cam and second switch means being relatively disposed to produce said tripping signal when said bolt is at a position intermediate said full locking and full unlocking positions, and record-forming means responsive to said tripping signal to effect a recording of said indication.

8. Lock apparatus comprising, a first key cylinder plug rotatable by the insertion therein from one side of said apparatus of any one of a plurality of first keys of different shapings, first switch means responsive to said shaping of any one of said keys when inserted into and thereafter rotated in said plug to provide an electric signal selectively indicative of the identity of that key, a bolt normally coupled to said first plug to be removable by the rotation thereof between a full locking and a full unlocking position, a second key cylinder plug rotatable by the insertion therein from the other side of said apparatus of a second key, means responsive to insertion of said second key in said second plug to break the coupling between said bolt and first plug and to couple said bolt to said second key so as to be movable between said positions by the rotation of said second key, means responsive to rotation of said second key to produce an electric signal indicative of the moving of said bolt by said second key, and means to record said signals.

9. Recording apparatus comprising, means to advance a record sheet through a recording zone, an array of pivot rods on one side of said zone, said rods each being rotatable about its axis and said rods each having a rotation-indicating printing element on an end face of such rod presented towards said zone, electro-mechanical means responsive to each of a plurality of different electric indicating signals to rotate at least a selected one of said rods so as to convert each of such signals into a different permutation in rotational position of the printing elements on said rods, a print hammer on the other side of said zone, and means responsive to a tripping signal produced after each such permutation has been set up to bring said sheet into contact with said elements to thereby produce a printing on said sheet of a representation of such permutation.

10. Recording apparatus comprising, a drive roll to advance a record sheet through a recording zone, an electric motor coupled with said roll, recording means at said zone, print hammer means adapted to strike said sheet at said zone so as to effect a recording thereon by said recording means, a multi-toothed escapement ratchet in rotatably fixed relation with said roll, normally open switch means in circuit with said motor to control the application of power thereto, lever means movable towards said switch means to close it and away from said switch means to open it, said lever means having a coupling with said hammer means and having also a pawl mating with said ratchet, said lever means being moved by said hammer means through said coupling to energize said motor by closing said switch means and to permit rotation of said roll by said energized motor by shifting said pawl outwards from between two teeth of said ratchet, said energized motor rotating said ratchet and roll to produce by the latter an advancement of said sheet through said zone, and means biasing said lever means to urge said shifted pawl first against the ratchet tooth brought under said pawl by such rotation and then into the space between such tooth and the one next following, said lever means upon said pawl entering said space being moved by said biasing means away from said switch means so as to de-energize said motor, and further advancement of said sheet by said roll being arrested by the presence of said pawl in said space.

11. Apparatus as in claim 10 further comprising clutch means coupled between said motor and roll to transmit the motion of the former to the latter, said clutch means permitting overtravel of said motor when the motion of said roll is arrested by said pawl entering said space.

12. Apparatus comprising, lock means responsive to insertion therein of any one of a plurality of different keys of different identifying shapings to provide an unlocking action, a plurality of contacts each corresponding to a respective single one of said keys, each contact being responsive to the shaping of the corresponding one of said keys when inserted to produce a single valued electric signal selectively indicative of the identity of that key, said plurality of contacts thereby being adapted to produce a plurality of signals of which each corresponds to a respective one of said keys, matrix circuit means to convert ones of said single valued signals into multiple digit binary signals different from each other and each corresponding to a respective one of said last named single valued signals, and means to record said multiple digit signals.

13. In recording apparatus the improvement comprising a supply spool for a record strip, a stationary shaft on which said spool is rotatably mounted and is axially slidable, said shaft being supported at one end from side support means, and said shaft having an opposite free end, a nut on the free end of said shaft to one side of said spool so that said spool is between said nut and said support means, said nut being held on said shaft by a threaded engagement for which the direction of tightening of said nut on said shaft is the same as the direction of rotation of said spool when supplying said strip, and a helical compression spring disposed around said shaft on the other side of said spool between said spool and support means so as to be compressed therebetween, said spring biasing said spool against said nut to create therebetween a friction force which both resists drawing out of said strip from said spool and maintains said nut tight on said shaft during such drawing out.

14. Lock apparatus comprising, a key cylinder having a plug rotatable by insertion therethrough and subsequent rotation of any one of a plurality of keys of which each has an identifying portion disposed for an inserted key on the indoor side of the cylinder in axially spaced relation from the indoor end of the cylinder, the spacing of such portion from said cylinder end being different for each key, a plurality of axially spaced first electric contacts disposed on said indoor side within a surface of revolution, a second electric contact on said side, said second contact being axially movable relative to said first contacts and being also rotatable in a plane transverse to the direction of key insertion to define said surface by axial and rotary movement thereof, and said second contact being adapted to engage any selected one of said first contacts when in axial registration therewith and when thereafter rotated in said plane, each of said first contacts corresponding to a respective one of said keys, and contact shift means disposed on said side in the path of said key, said shift means being responsive to insertion of any one of said keys to be actuated by said portion thereof in accordance with said spacing of such portion so as to bring said second contact into axial registration with that one of said first contacts which corresponds to such inserted key, and said shift means being further responsive to rotation of said key to rotate said second contact in said plane into engagement with such one contact.

15. Lock apparatus comprising, a key cylinder having a plug rotatable by the insertion therethrough and subsequent rotation of any one of a plurality of keys of differing length, a plurality of axially spaced fixed electrical contacts disposed on the indoor side of said cylinder in a line parallel with the axis of said plug, each of said fixed contacts being spaced from said cylinder by a distance corresponding to the respective length of a respective one of said keys, an axially movable electric contact ring rotatable from a reference angular position about an axis parallel to said line and spaced from said line by a distance less than the outer radius of said ring, said ring having therein a gap which angularly registers with said line when said ring is at said position, and which provides an axial passage transversable with clearance by said fixed contacts when said ring is axially moved while angularly remaining at said position, and contact shift means disposed on said inner side of said cylinder in the path of said key, said shift means being responsive to insertion of any one of said keys to bring said ring while at said reference position into axial registration with that one of said fixed contacts corresponding to the length of the inserted key, and said shift means being further responsive to rotation of such inserted key to correspondingly rotate said ring to produce engagement between said last-named fixed contact and said ring.

16. Apparatus as in claim 15 in which said contact shift means comprises, a first sleeve rotatably fixed at its inner end to the indoor end of said plug to rotate with said plug, and adapted to receive in the sleeve interior the shank end of each key inserted through said plug, said first sleeve having an outer end closure with a non-circular aperture therein, a second axially movable rotatable sleeve disposed around said first sleeve and having an end closure axially outward of that of said first sleeve, and a coupling rod having a free end in said first sleeve, and extending from said free end through said aperture to a connecting of said rod in axially and rotatably fixed relation with said end closure of said second sleeve, said rod axially slidable through said aperture but being of non-circular cross-section so as to be locked in said aperture in rotatably fixed relation with said first sleeve, and said inner end of said rod being engageable by said key end to be axially positioned in accordance with the axial position of such end.

17. Apparatus as in claim 16 further comprising a flange plate on the free end of said bar, and a compression spring around said bar between said flange plate and said end closure of said first sleeve, said bar being resiliently biased by said spring towards the inner end of said cylinder.

18. Apparatus as in claim 16 further comprising an axially stationary rotatable gear disposed axially outwards of said second sleeve in coaxial relation with said rod, said gear having therein a non-circular aperture in which said rod is received in axially slidable relation to be locked for rotation with said gear, a bolt disposed transverse of said rod to one side of said rod and gear, and gearing means coupled between said gear and bolt and by which rotation together of said plug, first sleeve, rod and gear produces linear transverse movement of said bolt.

19. Lock apparatus comprising, a first key cylinder plug disposed on the street side of said apparatus and rotatable by the insertion therein of a first key, a first spur gear coaxial with said plug and coupled thereto to rotate therewith, an axially movable shaft disposed parallel to the axis of said gear in spaced relation from and to one side of said gear, a second spur gear normally meshed with said first gear and mounted in axially and rotatably fixed relation on said shaft, a pinion gear likewise mounted on said shaft, a bolt disposed transverse of and to one side of said shaft, said bolt having therein a rack gear meshed with said pinion over a range of axial travel of said shaft, said bolt being transversely movable through said gears by the rotation of said plug, a second key cylinder plug disposed coaxial with said shaft on the indoor side of said apparatus, said second plug being rotatable by the insertion therein of a second key, and means by which said shaft is axially moved by the shank end of such inserted second key to disengage said second gear from said first gear and by which said shank end is rotatably coupled with said shaft to permit rotation of said shaft and consequent movement of said bolt by the rotation of said second key.

20. Apparatus as in claim 19 further comprising means to produce re-engagement of said first and second gears upon withdrawal of said second key from said second plug, said first and second teeth having mating teeth which are chamfered to facilitate such re-engagement.

21. Lock apparatus comprising a first key cylinder plug on one side of said apparatus, said plug being rotatable by the insertion therein and rotation therein of a first key, a bolt normally coupled to said plug to be driven by the rotation thereof between full locking and full unlocking positions, a second key cylinder plug on the side of said apparatus away from said first plug said second plug being rotatable by the insertion therein and rotation therein of a second key, and means responsive to insertion of said second key in said second plug and subsequent rotation of said second key to break the coupling between said bolt and first plug and to couple said bolt and second key so as to produce movement of said bolt between said positions in response to rotation of said second key.

References Cited by the Examiner
UNITED STATES PATENTS

| | | | |
|---|---|---|---|
| 981,164 | 1/1911 | Bush et al. | 70—434 |
| 1,417,715 | 5/1922 | Bryce | 346—53 X |
| 2,278,919 | 4/1942 | Erickson et al. | 346—79 X |
| 2,905,926 | 9/1959 | Aid | 317—134 X |
| 3,187,334 | 6/1965 | Humphrey | 346—53 X |

RICHARD B. WILKINSON, *Primary Examiner.*

J. W. HARTARY, *Assistant Examiner.*